US011977096B2

(12) United States Patent
Howard

(10) Patent No.: US 11,977,096 B2
(45) Date of Patent: May 7, 2024

(54) MOTION, VIBRATION AND ABERRANT CONDITION DETECTION AND ANALYSIS

(71) Applicant: Baker Hughes Oilfield Operations LLC, Houston, TX (US)

(72) Inventor: Brian F. Howard, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 583 days.

(21) Appl. No.: 17/138,349

(22) Filed: Dec. 30, 2020

(65) Prior Publication Data

US 2021/0208178 A1 Jul. 8, 2021

Related U.S. Application Data

(60) Provisional application No. 62/956,483, filed on Jan. 2, 2020.

(51) Int. Cl.
*G01M 7/02* (2006.01)
*G01B 7/14* (2006.01)
*G01P 3/49* (2006.01)

(52) U.S. Cl.
CPC .................. *G01P 3/49* (2013.01); *G01B 7/14* (2013.01); *G01M 7/022* (2013.01)

(58) Field of Classification Search
CPC .................................. G01M 7/022; G01B 7/14
See application file for complete search history.

(56) References Cited

U.S. PATENT DOCUMENTS

| 6,727,725 | B2* | 4/2004 | Devaney | G01M 13/045 |
| | | | | 324/545 |
| 8,882,662 | B2* | 11/2014 | Charles | A61B 17/16 |
| | | | | 600/210 |
| 9,285,477 | B1* | 3/2016 | Smith | G01S 7/4817 |
| 10,416,429 | B2* | 9/2019 | Lukes | G02B 21/025 |
| 2016/0217587 | A1* | 7/2016 | Hay | G06T 7/262 |
| 2016/0217588 | A1* | 7/2016 | Hay | G06T 7/262 |
| 2016/0300341 | A1* | 10/2016 | Hay | G06F 3/04847 |
| 2018/0095175 | A1* | 4/2018 | O'Keeffe | G01S 17/42 |

OTHER PUBLICATIONS

Bently, Donald E., and Hatch, Charles T. "Fundamentals of Rotating Machinery Diagnostics." Bently Pressurized Bearing Press, 2002, excerpts including front matter (1 page), Ch. 5 (14 pages), and Ch. 6 (28 pages).

(Continued)

*Primary Examiner* — Rina I Duda
(74) *Attorney, Agent, or Firm* — Mintz, Levin, Cohn, Ferris, Glovsky and Popeo, P.C.

(57) ABSTRACT

A method of analyzing a structural condition of a machine is described. The method includes determining a position of a portion of a machine, a rotating shaft, a fluid transfer system, or a reciprocating machine in operation; collecting an image of the portion with an image collector; synchronizing the determined position of the portion with the collected image of the portion; amplifying the synchronized image; and storing the amplified image to a memory. Related apparatuses, systems, storage media, techniques and articles are also described.

20 Claims, 9 Drawing Sheets

(56) References Cited

OTHER PUBLICATIONS

Howes, et al., "Vibration Related Failures of Small-Bore Attachments", Beta Machinery Analysis Ltd., Calgary, AB, Canada, T3C 0J7, 13 pages (www.betamachinery.com), Nov. 20, 2014; archived at Wayback Machine (web.archive.org/), accessed Dec. 28, 2020.
Broerman, Eugene and Mueller, Kirk. (Kinder-Morgan). "Recip Generated Pulsations In a Centrifugal Compressor Piping System." See, pp. 3-6 (20 pages). Gas Machinery Journal. First quarter, 2013.
General Electric Corp. "Transducer Installation & Maintenance." Student Course Manual Book 1 of 2. 254 pages. Mar. 2009.

\* cited by examiner

MOTION, VIBRATION AND ABERRANT CONDITION DETECTION AND ANALYSIS

CROSS-REFERENCE TO RELATED APPLICATION

This application claims the benefit of U.S. Provisional Patent Application No. 62/956,483, filed Jan. 2, 2020, and entitled "SYNCHRONOUS MOTION AMPLIFICATION", the entirety of which is incorporated herein by reference.

BACKGROUND

The field of this disclosure relates to improvements in motion, vibration and aberrant condition detection and analysis for machinery including rotating shafts, reciprocating machines, turbomachinery, pipes, pipelines, related machinery, and the like. Motion, vibration and aberrant detection and analysis includes synchronous motion amplification, which permits visualization and study of phenomena not normally visible to the naked eye.

The improvements in motion, vibration and aberrant condition detection and analysis may be applied to machinery used in a variety of fields including energy; industrial machinery and technology; oil and gas exploration, extraction and processing; methane monitoring, management and verification; carbon capture, use and storage; renewables and alternative energy; low carbon technology; liquefied natural gas solutions; subsea operations; digital transformation; remote operations; and the like.

To detect at least one aberrant condition and prevent system malfunction, machines are monitored with sensors to measure operating conditions such as temperature, motion, vibration and pressure. For example, some structural characteristics of machines have relatively small motion characteristics (e.g., less than the thickness of a human hair or less than about 90 µm), which are difficult for a human observer to see without a visual aid.

Many developed sensors for detecting motion characteristics are relatively expensive, not easily installed, not capable of being placed in an optimal position, not easily moved or replaced, interfere with machine operation, interfere with monitoring itself, and/or require additional repair and maintenance cycles.

Various techniques including non-destructive testing (NDT) have been developed to augment or replace direct measurement techniques. Motion amplification is one such NDT technique. Motion amplification may be used in the fields of sensors, analytics, signal processing, machinery diagnostics, condition monitoring, and related disciplines.

Motion amplification involves observation and enhancement of a video image of a machine and typically includes output of an enhanced video image for human observation to promote visualization and study of the machine. In some systems, video cameras record video at a certain frame rate, i.e., the number of image units captured per given unit of time, e.g., frames per second or fps. Video cameras with increasingly high fps rates allow generation of increasingly slow motion video. However, even the highest fps video cameras are not well suited to the observation, detection and prevention of all phenomena of interest.

Specifically, for example, in the turbomachinery art, developed systems for detecting rotating imbalance included collection of images triggered by a rotating unbalance response at 1X the shaft speed, where 1X refers to signal content in a narrow passband filter with a center frequency equal to a running speed of a machine. The determination of the shaft speed introduces a source of potential error or inaccuracy into an image analysis process, i.e., an error in calculating the speed compounds and complicates the process, particularly when attempted to detect relatively small variations (e.g., under about 100 µm) in motion.

Further, developed eddy-current probes were used to measure relative vibration between a shaft and a bearing. However, installation and maintenance of the developed eddy-current probe systems required shut down and/or modification of existing shaft and bearing systems causing expense, e.g., downtime and delay.

Still further, developed vibration detection systems for pipes required relocation of system components to improve overall system performance.

The present inventors developed improvements in systems, devices and methods for motion, vibration and aberrant condition detection and analysis for machinery including rotating shafts, reciprocating machines, turbomachinery, pipes, pipelines, related machinery, and the like. The improved systems, devices and methods overcome at least the above-referenced problems with the devices and methods of the related art.

SUMMARY

A system, device and method of motion, vibration and aberrant condition detection and analysis for machinery including rotating shafts, reciprocating machines, turbomachinery, pipes, pipelines, related machinery, and the like, are provided.

A method includes one or more of the following: transmitting instructions to a motive power supply of a machine to actuate the machine; determining a position of the machine; collecting images of the machine with an image collector; synchronizing the detected position of the machine with one of the images of the machine; amplifying the one of the images of the machine associated with the position; and/or storing the amplified one of the images of the machine associated with the position to a memory.

The method may be provided so that an image capture rate of the image collector is a number of the images of the machine per revolution or reciprocation of the machine, and wherein the image capture rate of the image collector is not a number of frames per unit of time.

The method may be provided so that the amplifying includes amplifying display of motion across a distance greater than about 0.1 µm and less than about 100 µm.

The method may be provided so that, in the collecting images of the machine with an image collector, for at least one image, a signal to store the image is sent in response to a specified position of the machine.

The method may further include outputting a video including the amplified images of the machine associated with the position.

The method may be provided so that the video includes an indicator of the position for one or more frames.

The method may further include detecting a structural condition based on the amplified images of the machine associated with the position.

The method may be provided so that the structural condition is a vibration condition.

The method may be provided so that the vibration condition is a lateral mode shape, torsional vibration, or torsional deflection.

The method may be provided so that the motive power supply includes a motor, and wherein the machine includes a rotating shaft.

A system includes one or more of the following: at least one processor; and/or a memory storing at least one program for execution by the at least one processor, the at least one program including instructions, which when executed by the at least one processor cause the at least one processor to perform operations.

The operations may include on or more of the following: transmitting instructions to a motive power supply of a machine to actuate the machine; determining a position of the machine; collecting images of the machine with an image collector; synchronizing the determined position of the machine with one of the images of the machine; amplifying the one of the images of the machine associated with the position; and/or storing the amplified one of the images of the machine associated with the position to a memory.

The system may further include: the machine; the motive power supply configured to actuate the machine; and/or the image collector configured to collect images of the machine.

The system may be provided so that an image capture rate of the image collector is a number of the images of the machine per revolution or reciprocation of the machine, and wherein the image capture rate of the image collector is not a number of frames per unit of time.

The system may be provided so that the amplifying includes amplifying display of motion across a distance greater than about 0.1 µm and less than about 100 µm.

The system may be provided so that, in the collecting images of the machine with an image collector, for at least one image, a signal to store the image is sent in response to a specified position of the machine.

The system may further include outputting a video including the amplified images of the machine associated with the position.

The system may be provided so that the video includes an indicator of the position for one or more frames.

The system may further include detecting a structural condition based on the amplified images of the machine associated with the position.

The system may be provided so that the structural condition is a vibration condition.

The system may be provided so that the vibration condition is a lateral mode shape, torsional vibration, or torsional deflection.

The system may be provided so that the motive power supply includes a motor, and wherein the machine includes a rotating shaft.

A non-transitory computer-readable storage medium storing at least one program, the at least one program for execution by at least one processor and a memory storing the at least one program, the at least one program including instructions, which when executed by the at least one processor cause the at least one processor to perform operations.

The operations may include one or more of the following: transmitting instructions to a motive power supply of a machine to actuate the machine; determining a position of the machine; collecting images of the machine with an image collector; synchronizing the detected position of the machine with one of the images of the machine; amplifying the one of the images of the machine associated with the position; and/or storing the amplified one of the images of the machine associated with the position to a memory.

The non-transitory computer-readable storage medium may be provided so that an image capture rate of the image collector is a number of the images of the machine per revolution or reciprocation of the machine, and wherein the image capture rate of the image collector is not a number of frames per unit of time.

The non-transitory computer-readable storage medium may be provided so that the amplifying includes amplifying display of motion across a distance greater than about 0.1 µm and less than about 100 µm.

The non-transitory computer-readable storage medium may be provided so that, in the collecting images of the machine with an image collector, for at least one image, a signal to store the image is sent in response to a specified position of the machine.

The non-transitory computer-readable storage medium may further include outputting a video including the amplified images of the machine associated with the position.

The non-transitory computer-readable storage medium may be provided so that the video includes an indicator of the position for one or more frames.

The non-transitory computer-readable storage medium may further include detecting a structural condition based on the amplified images of the machine associated with the position.

The non-transitory computer-readable storage medium may be provided so that the structural condition is a vibration condition.

The non-transitory computer-readable storage medium may be provided so that the vibration condition is a lateral mode shape, torsional vibration, or torsional deflection.

The non-transitory computer-readable storage medium may be provided so that the motive power supply includes a motor, and wherein the machine includes a rotating shaft.

A method may include one or more of the following: determining a position of at least one portion of a machine in motion or a fluid transfer system in operation; collecting images of the at least one portion of the machine or the fluid transfer system with an image collector; synchronizing the determined position of the at least one portion of the machine or the fluid transfer system with at least a selected one of the images of the at least one portion of the machine or the fluid transfer system; amplifying at least one of the collected images and/or the selected one of the images of the at least one portion of the machine or the fluid transfer system; and/or storing the amplified at least one of the collected images and/or the selected one of the images of the at least one portion of the machine or the fluid transfer system to a memory.

An image capture rate of the image collector may be a number of the images of the at least one portion of the machine per revolution or reciprocation of the machine or a number of the images corresponding with a repeating cycle of a pumping system of the fluid transfer system, and the image capture rate of the image collector may not be a number of frames per unit of time.

The amplifying may include amplifying display of motion across a distance greater than about 0.1 µm and less than about 100 µm.

In the collecting images of the at least one portion of the machine or the fluid transfer system with an image collector, for at least one image, a signal to store the image may be sent in response to a specified position of the machine, the fluid transfer system, or a pumping system of the fluid transfer system.

The method may further include outputting a video including the amplified at least one of the collected images and/or the selected one of the images of the at least one portion of the machine or the fluid transfer system.

The video may include an indicator of the position for one or more frames.

The method may further include detecting a structural condition based on the amplified at least one of the collected images and/or the selected one of the images of the at least one portion of the machine or the fluid transfer system.

The structural condition may be a vibration condition.

The vibration condition may be a lateral mode shape, torsional vibration, or torsional deflection.

The machine may include a rotating shaft or the fluid transfer system may include a pipe.

The selected one of the images of the machine or the fluid transfer system may depict the machine or the fluid transfer system operating in a normal or predetermined operating condition.

The method may further include transmitting instructions to a motive power supply of the machine or a pumping system for moving fluid through the fluid transfer system to actuate the machine or the pumping system.

The method may further include detecting a structural condition or a vibration condition of the machine or the fluid transfer system based on the amplified at least one of the collected images and/or the selected one of the images of the machine or the fluid transfer system.

The method may further include determining whether a predetermined threshold deviates from a predetermined standard indicative of a normal operation of the machine or the fluid transfer system.

The method may further include signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

A system may include at least one processor; and/or a memory storing at least one program for execution by the at least one processor, the at least one program including instructions, which when executed by the at least one processor cause the at least one processor to perform operations.

The operations may include one or more of the following: determining a position of at least one portion of a machine in motion or a fluid transfer system in operation; collecting images of the at least one portion of the machine or the fluid transfer system with an image collector; synchronizing the detected position of the at least one portion of the machine or the fluid transfer system with at least a selected one of the images of the at least one portion of the machine or the fluid transfer system; amplifying at least one of the collected images and/or the selected one of the images of the at least one portion of the machine for the fluid transfer system; and/or storing the amplified at least one of the collected images and/or the selected one of the images of the at least one portion of the machine or the fluid transfer system to a memory.

The system may further include: the machine; the motive power supply configured to actuate the machine; and/or the image collector configured to collect images of the machine.

An image capture rate of the image collector may be a number of the images of the at least one portion of the machine per revolution or reciprocation of the machine or a number of the images corresponding with a repeating cycle of a pumping system of the fluid transfer system, and the image capture rate of the image collector may be not a number of frames per unit of time.

The amplifying may include amplifying display of motion across a distance greater than about 0.1 µm and less than about 100 µm.

In the collecting images of the at least one portion of the machine or the fluid transfer system with an image collector, for at least one image, a signal to store the image may be sent in response to a specified position of the machine, the fluid transfer system, or a pumping system of the fluid transfer system.

The operations may further include outputting a video including the amplified at least one of the collected images and/or the selected one of the images of the at least one portion of the machine or the fluid transfer system.

The video may include an indicator of the position for one or more frames.

The operations may further include detecting a structural condition based on the amplified at least one of the collected images and/or the selected one of the images of the at least one portion of the machine or the fluid transfer system.

The structural condition may be a vibration condition.

The vibration condition may be a lateral mode shape, torsional vibration, or torsional deflection.

The machine may include a rotating shaft or the fluid transfer system may include a pipe.

The selected one of the images of the machine or the fluid transfer system may depict the machine or the fluid transfer system operating in a normal or predetermined operating condition.

The operations may further include one or more of the following: transmitting instructions to a motive power supply of the machine or a pumping system for moving fluid through the fluid transfer system to actuate the machine or the pumping system; detecting a structural condition or a vibration condition of the machine or the fluid transfer system based on the amplified at least one of the collected images and/or the selected one of the images of the machine or the fluid transfer system; determining whether a predetermined threshold deviates from a predetermined standard indicative of a normal operation of the machine or the fluid transfer system; and/or signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

A non-transitory computer-readable storage medium storing at least one program, the at least one program for execution by at least one processor and a memory storing the at least one program, the at least one program including instructions, which when executed by the at least one processor cause the at least one processor to perform operations.

The operations may include one or more of the following: determining a position of at least one portion of a machine in motion or a fluid transfer system in operation; collecting images of the at least one portion of the machine or the fluid transfer system with an image collector; synchronizing the determined position of the at least one portion of the machine or the fluid transfer system with at least a selected one of the images of the at least one portion of the machine or the fluid transfer system; amplifying the at least one of the collected images and/or the selected one of the images of the at least one portion of the machine for the fluid transfer system; and/or storing the amplified at least one of the collected images and/or the selected one of the images of the at least one portion of the machine or the fluid transfer system to a memory.

An image capture rate of the image collector may be a number of the images of the at least one portion of the machine per revolution or reciprocation of the machine or a number of the images corresponding with a repeating cycle of a pumping system of the fluid transfer system, and wherein the image capture rate of the image collector may be not a number of frames per unit of time.

The amplifying may include amplifying display of motion across a distance greater than about 0.1 μm and less than about 100 μm.

In the collecting images of the at least one portion of the machine or the fluid transfer system with an image collector, for at least one image, a signal to store the image may be sent in response to a specified position of the machine, the fluid transfer system, or a pumping system of the fluid transfer system.

The operations may further include outputting a video including the amplified at least one of the collected images and/or the selected one of the images of the at least one portion of the machine or the fluid transfer system.

The video may include an indicator of the position for one or more frames.

The operations may further include detecting a structural condition based on the amplified at least one of the collected images and/or the selected one of the images of the at least one portion of the machine or the fluid transfer system.

The structural condition may be a vibration condition.

The vibration condition may be a lateral mode shape, torsional vibration, or torsional deflection.

The machine may include a rotating shaft or the fluid transfer system may include a pipe.

The selected one of the images of the machine or the fluid transfer system may depict the machine or the fluid transfer system operating in a normal or predetermined operating condition.

The operations may further include one or more of the following: transmitting instructions to a motive power supply of the machine or a pumping system for moving fluid through the fluid transfer system to actuate the machine or the pumping system; detecting a structural condition or a vibration condition of the machine or the fluid transfer system based on the amplified at least one of the collected images and/or the selected one of the images of the machine or the fluid transfer system; determining whether a predetermined threshold deviates from a predetermined standard indicative of a normal operation of the machine or the fluid transfer system; and/or signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

These and other capabilities of the disclosed subject matter will be more fully understood after a review of the following figures, detailed description, and claims.

DESCRIPTION OF DRAWINGS

These and other features will be more readily understood from the following detailed description taken in conjunction with the accompanying drawings, in which.

Figure 1:
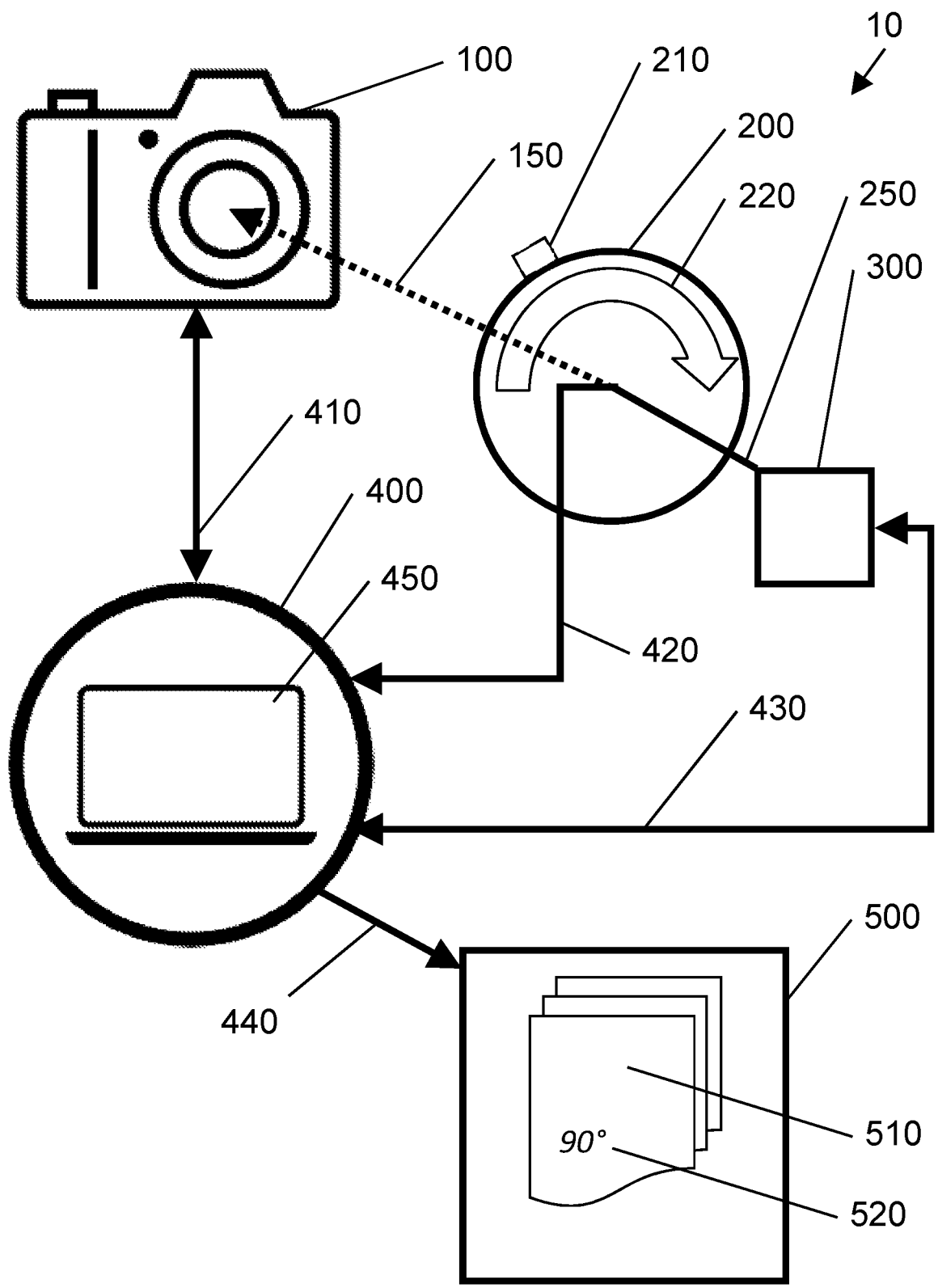
FIG. 1 is a schematic diagram illustrating a system for detecting and analyzing synchronous motion including an amplification function according to an exemplary embodiment.

It is noted that the drawings are not necessarily to scale. The drawings are intended to depict only typical aspects of the subject matter disclosed herein, and therefore should not be considered as limiting the scope of the disclosure. The structures, systems, devices, and methods specifically described herein and illustrated in the accompanying drawings are non-limiting exemplary embodiments. The scope of the present invention is defined solely by the claims.

DETAILED DESCRIPTION

Motion amplification to provide real time visualization of structural vibrational characteristics such as rotor mode shape or torsional deflection can be improved by obtaining images (including video) synchronized with a frame rate synchronized to a rotor speed and/or angle of rotation (not a number of frames per unit time). Synchronizing the frame rate to the rotor enables detection and displacement of vibration patterns of interest. Synchronizing the frame rate to the rotor further enables visualization of shape modes and torsional deflections without the need for discrete measurements (which can require installation of instrumentation on the machine, which can be invasive and can require a service outage), and without models and their associated assumptions. Shape mode analysis may be based on methods such as principal component analysis and the like. As a result, more complete information about an observation target can be captured and measured without instrumentation or modeling. The observation target may be, for example, a rotating shaft such as a crankshaft or a reciprocating machine such as an internal combustion engine.

Synchronous motion amplification is described. Synchronous motion amplification may be incorporated into a machinery dynamics monitor for use in signal processing for complex mechanical systems. Synchronous motion amplification may be incorporated into a machinery protection system for detecting and preventing errors during operation of rotating machinery. Synchronous motion amplification may be incorporated into a rolling element bearing condition analytics system. Synchronous motion amplification may be used in a wide variety of industries including additive and industrial manufacturing, aerospace, automotive, oil and gas, power generation, renewable energy, water treatment, pulp and paper, mining, cement, and the like.

Video motion amplification may be used to process images obtained by synchronous motion amplification in order to exaggerate relatively small motion (e.g., motion across a distance less than about 100 µm) so that the motion can be detected and analyzed in playback. High speed video cameras may be used to collect video for processing. Conventionally, a clock in the video camera may set a frame rate and trigger capture of at least one frame in the video. In contrast, in some implementations, some vibration conditions, such as lateral mode shape and torsional vibration, can be better visualized when the data is collected synchronously with respect to a rotor speed, rather than with respect to time. A once-per-turn reference signal from the shaft may set the frame rate so that motion amplification occurs relative to the shaft position, rather than time. Other suitable timings may be implemented including, for example, more or less than once per turn, once every degree, once every fraction of a degree, once every 45 degrees, and the like.

Synchronous motion amplification allows the actual shaft deflection to be measured and viewed and avoids invasive sensors (such as sensors and rotor models for approximating shaft motion). By eliminating the use of invasive sensors, machine outages are reduced.

As noted above, the relatively small motion, e.g., the motion across the distance less than about 100 may refer to any distance under about 100 The ability to detect the relatively small motion may have a practical lower limit dependent on the camera, a distance between the camera and the object, and the like. The practical lower limit may be, for example, as low as about 1.0 µm. In some exemplary embodiments, the practical lower limit may be as low as about 0.1 µm. The cameras may be configured to detect motion less than about 0.1 µm.

The sensors described herein are not limited to any particular type and may include, without limitation, one or more of a magnetostrictive sensor, an encoder, a torque sensor, a KEYPHASOR™ (KEYPHASOR™ is a registered trademark of Bently Nevada, a Baker Hughes business), a radial vibration sensor, a thrust sensor, an acceleration sensor, a shear sensor, a stress sensor, a strain sensor, an angular momentum sensor, a tension sensor, a compression sensor, a vibration sensor, any sensor configured to obtain information about one or more portions of a rotating shaft, a reciprocating machine, turbomachinery, pipes, pipelines, and the like, either alone or in any suitable combination with one or more of the other listed sensors other, or any other type of sensor.

System

FIG. 1 depicts a system 10 for analyzing a structural condition of a machine 200 according to an exemplary implementation. The system 10 may include the machine 200. The system may include a motive power supply 300 configured to actuate the machine 200. The machine 200 may be driven by the motive power supply 300 to rotate in a clockwise direction 220 or a counter-clockwise direction (not shown). The motive power supply 300 may be a motor connected to the machine 200 via a rotational shaft or crankshaft 250.

The system 10 may include an image collector 100, such as a digital camera, configured to receive light 150 reflected or emitted by the machine 200 incident on a lens, aperture or photosensor of the image collector 100 and converted into images of the machine 200. An exterior surface of the machine 200 may include a marking device 210, which may include a tag or marker, which may be imaged by the image collector 100 in order to determine a rotational position of the machine 200.

The system 10 may include a computing device 400. The computing device 400 may be connected to the image collector 100 with a first physical, wireless or cloud-based connection 410 to permit transmission of images of the machine 200 from the image collector 100 to the computing device 400. Also, the connection 410 may permit signals or information to be sent from the computing device 400 to the image collector 100. In some implementations, the computing device 400 may be separate from or integrated into the image collector 100.

The computing device 400 may be connected to the machine 200 with a second physical, wireless or cloud-based connection 420 to permit transmission of signals or information about a state of the machine 200 from the machine 200 to the computing device 400. The state of the machine 200 may include, for example, a rotational position of the machine 200, a speed of operation of the machine 200, a temperature of the machine 200, and the like, which may be determined by visual inspection with the image collector 100 or with a sensor mounted on a surface of or embedded within the machine 200.

The computing device 400 may be connected to the motive power supply 300 with a third physical, wireless or cloud-based connection 430 to permit transmission of signals or information about a state of the motive power supply 300 from the motive power supply 300 to the computing device 400. The state of the motive power supply 300 may include, for example, a speed of operation of the motive power supply 300, a temperature of the motive power supply 300, and the like, which may be determined by a sensor mounted on a surface of or embedded within the motive power supply 300. Also, the computing device 400 may be configured to send driving signals to the motive power supply 300 via the third physical, wireless or cloud-based connection 430.

The computing device 400 may be configured to output the images of the machine 200 to an integrated display 450 or an external display 500 configured to display images 510 of the machine 200 including a video generated by the computing device 400.

The computing device 400 may append images 510 of the machine 200 to include an indicator 520 of information about the machine 200. The indicator 512 may be the position of the machine 200. The computing device 400 may include a fourth physical, wireless or cloud-based connection 440 to permit transmission of signals or information from the computing device 400 to the integrated display 450 or the external display 500.

Computer-Implemented System

Figure 2:
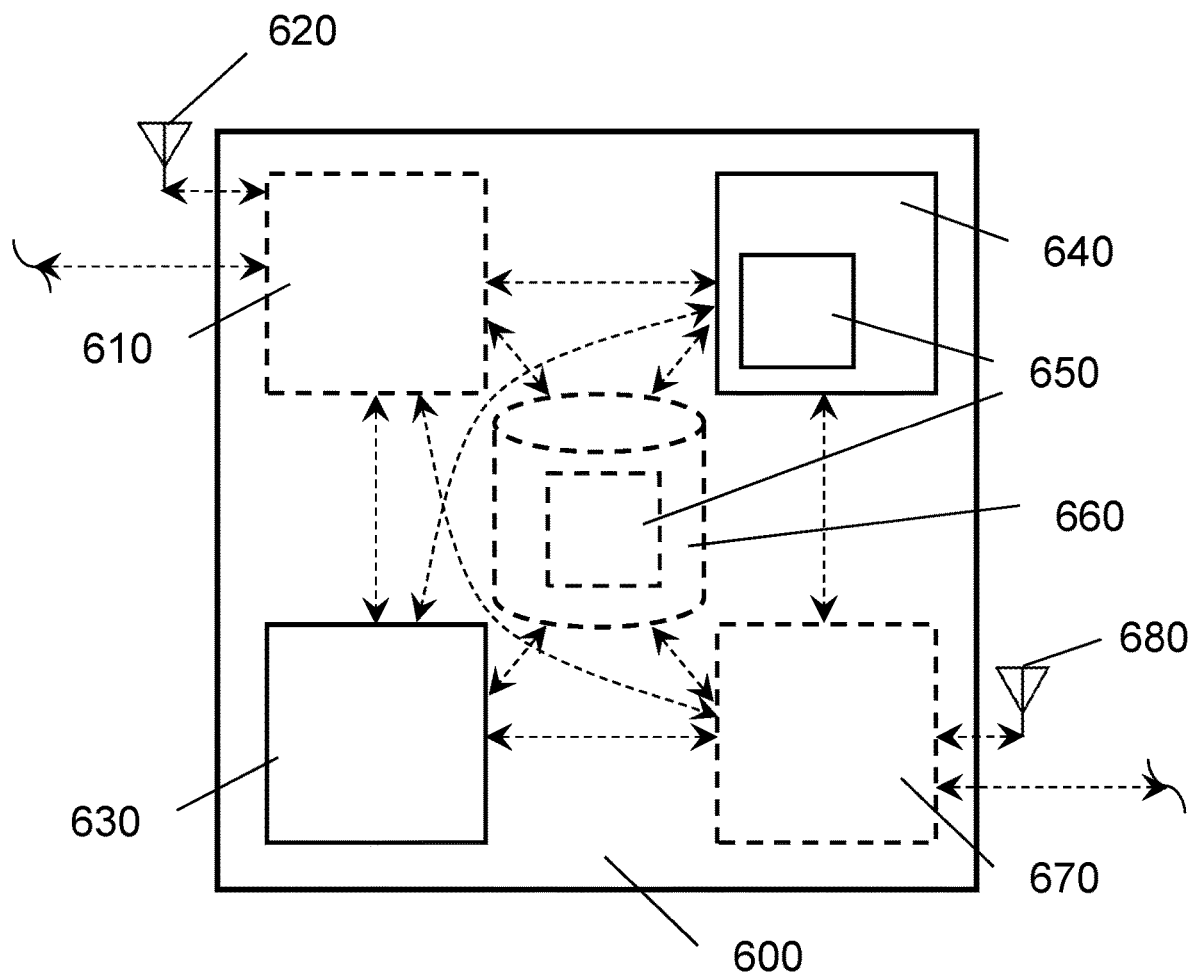
FIG. 2 is a schematic depiction of a computer device or system including at least one processor and a memory storing at least one program for execution by the at least one processor according to an exemplary embodiment.

In some implementations, as shown for example in FIG. 2, a device or system 600 may include at least one processor 630 and a memory 640 storing at least one program 650 for execution by the at least one processor 630. The device or system 600 may further include a non-transitory computer-readable storage medium 660 storing the at least one program 650 for execution by the at least one processor 630 of the device or system 600. The device or system 600 may further include at least one input device 610, which may be configured to send or receive information to or from any one from the group consisting of: an external device (e.g., image collector 100), the at least one processor 630, the memory 640, the non-transitory computer-readable storage medium 660, and at least one output device 670. The at least one input device 610 may be configured to wirelessly send or receive information to or from the external device via a means for wireless communication, such as an antenna 620, a transceiver (not shown) or the like.

In some implementations, the device or system 600 may further comprise at least one output device 670, which may be configured to send or receive information to or from any one from the group consisting of: an external device (e.g., a display connected to the computing device 400 configured to display images including a video), the at least one input device 610, the at least one processor 630, the memory 640, and the non-transitory computer-readable storage medium 660. The at least one output device 670 may be configured to wirelessly send or receive information to or from the external device via a means for wireless communication, such as an antenna 680, a transceiver (not shown) or the like.

Method and Computer-Implemented Instructions

Figure 3A:
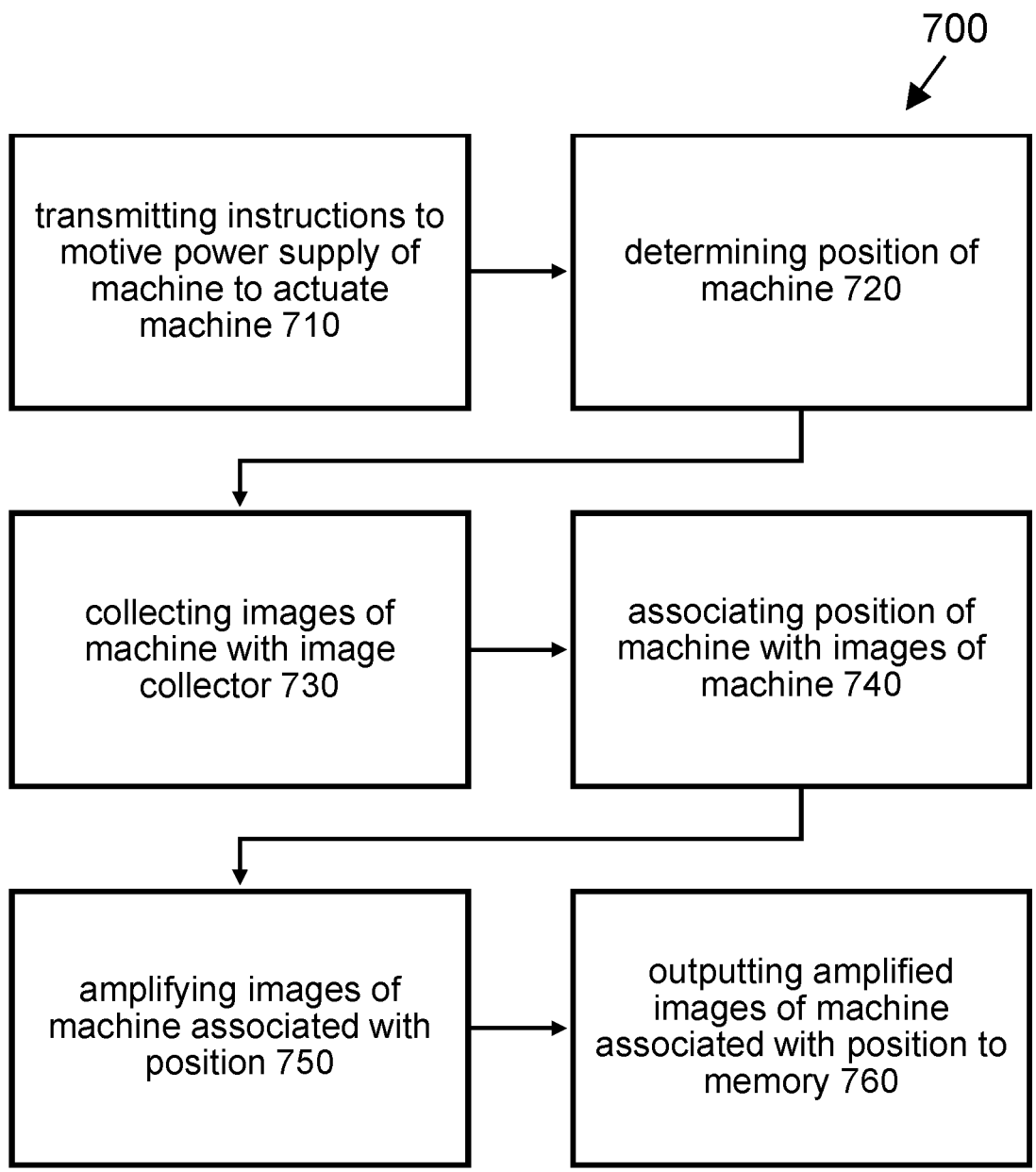
FIG. 3A is a process diagram illustrating a method of detecting and analyzing synchronous motion including an amplification function according to an exemplary embodiment.

As shown in FIG. 3A, in some implementations, at least one program may include instructions, which, when executed by the at least one processor 630 may cause the at least one processor 630 to perform operations. Alternatively, FIG. 3A depicts a method 700 including one or more steps as noted below. The operations or steps of the program or method 700 may include one or more of the following: transmitting 710 instructions to the motive power supply 300 of the machine 200 to actuate the machine 200; and/or determining 720 a position of the machine 200. The position may be, for example, a rotational position of a shaft and/or a reciprocating position of a cylinder of an internal combustion engine. The operations or method steps may further include one or more of the following: collecting 730 images of the machine 200 with an image collector 100; associating 740 the position of the machine 200 with the images of the machine 200; amplifying 750 the images of the machine 200 associated with the position; and/or outputting 760 the amplified images of the machine associated with the position to the memory 640.

Figure 3B:
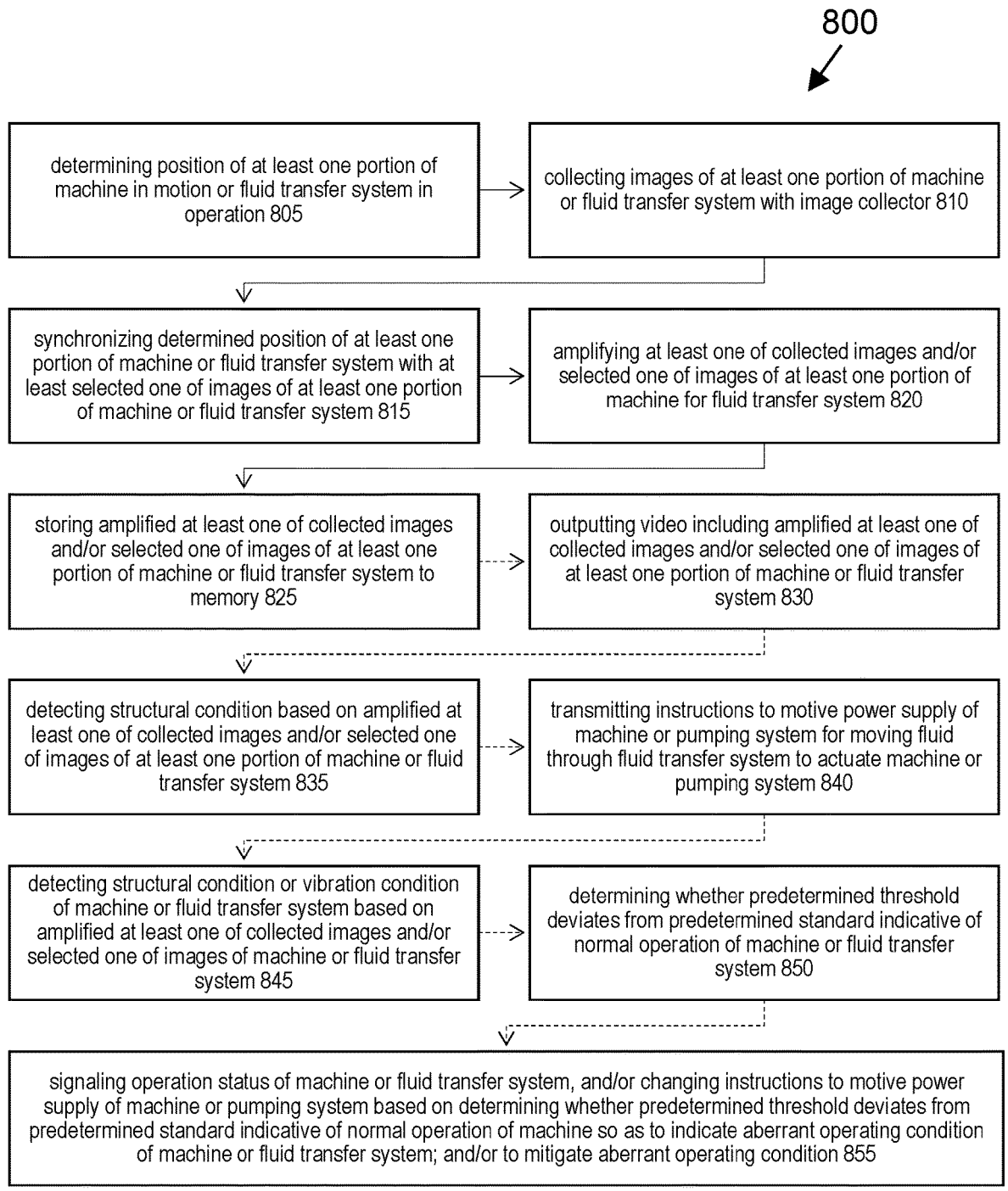
FIG. 3B is a process diagram illustrating another method of detecting and analyzing synchronous motion according to an exemplary embodiment.

As shown in FIG. 3B, in some implementations, at least one program may include instructions, which, when executed by the at least one processor 630 may cause the at least one processor 630 to perform operations. Alternatively, FIG. 3B depicts a method 800 including one or more steps as noted below. The operations or steps of the program or method 800 may include one or more of the following: determining a position of at least one portion of a machine or a fluid transfer system in operation 805; collecting at least one image of the at least one portion of the machine or the fluid transfer system with an image collector 810; synchronizing the detected position of the at least one portion of the machine or the fluid transfer system with at least at least one of the collected at least one image of the at least one portion of the machine or the fluid transfer system 815; amplifying at least one of the collected at least one image and/or the selected one of the collected at least one image of the at least one portion of the machine for the fluid transfer system 820; storing the amplified at least one of the collected at least one image and/or the selected one of the collected at least one image of the at least one portion of the machine or the fluid transfer system to a memory 825; outputting a video including the amplified at least one of the collected at least one image and/or the selected one of the collected at least one image of the at least one portion of the machine or the fluid transfer system 830; detecting a structural condition based on the amplified at least one of the collected at least one image and/or the selected one of the collected at least one image of the at least one portion of the machine or the fluid transfer system 835; transmitting instructions to a motive power supply of the machine or a pumping system for moving fluid through the fluid transfer system to actuate the machine or the pumping system 840; detecting at least one of a structural condition, a vibration condition, a motion condition, a torsion condition, and an aberrant condition of the machine or the fluid transfer system based on the amplified at least one of the collected at least one image and/or the selected one of the collected at least one image of the machine or the fluid transfer system 845; determining whether a predetermined threshold deviates from a predetermined standard indicative of a normal operation of the machine or the fluid transfer system 850; and/or signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition 855.

Exemplary Application to Rotating Shaft

As noted above, using the developed systems for detecting an imbalance in a rotating shaft, when using multiples of a shaft speed in order to capture images, limitations and inaccuracies were observed. For example, analysis using multiples such as one, two or three times the shaft speed to accurately determine a vibration in the turbomachinery system was unable to determine types of vibration that do not occur at such speeds. Other developed systems used the fps rate of a camera to analyze vibration response. Such fps-based methods were also found to be limiting, e.g., such systems were unable to accurately determine types of vibration that do not occur at such fps rates. To solve these problems, the following system, device and method are provided.

Figure 4:
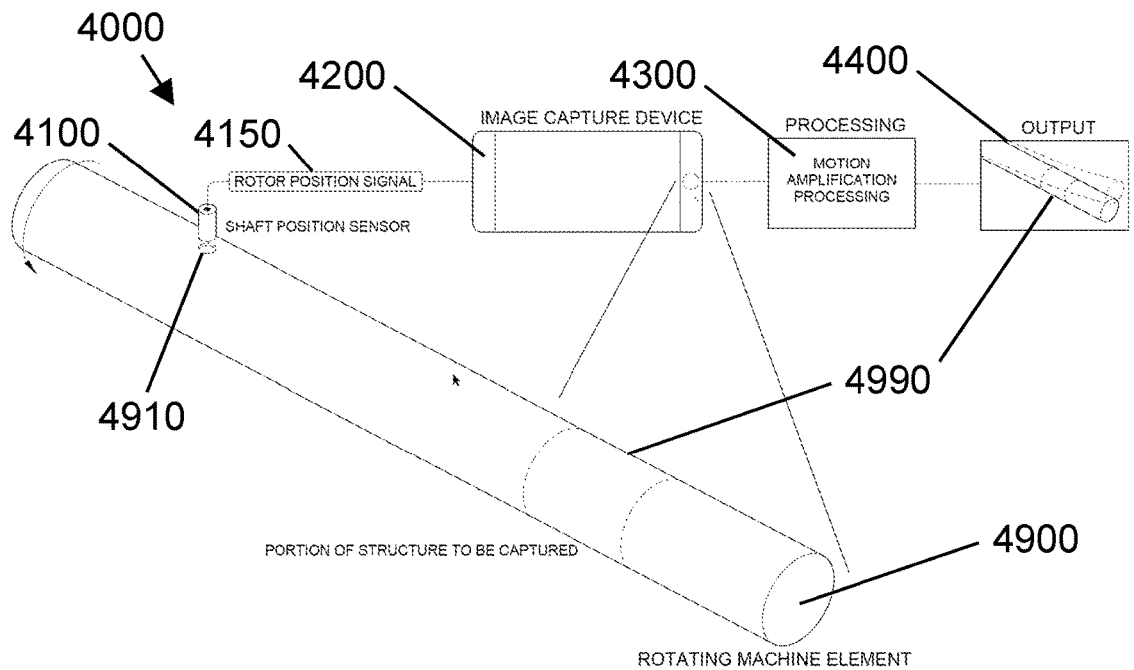
FIG. 4 is a schematic diagram illustrating a system for detecting and analyzing synchronous motion amplification according to an exemplary embodiment.

As shown, for example, in FIG. 4, an improved system 4000 for motion, vibration and aberrant condition detection and analysis for a machine 4900 is provided. The machine 4900 may be a rotating shaft, a reciprocating portion of a reciprocating machine, turbomachinery, a pipe for a fluid transfer system, a related machine, and the like. The system 4000 may include one or more of the following: one or more sensors 4100, one or more image capture devices 4200, and one or more processors 4300 configured to conduct processing, e.g., motion analysis processing including motion amplification processing, and/or configured to transmit output 4400 related to the output of the one or more image capture devices 4200. The one or more sensors 4100 may be configured to measure a portion of the machine 4900, e.g., a shaft (as shown in FIG. 4). The one or more sensors 4100 may be configured to measure (or estimate) a position of the shaft relative to, e.g., a fixed reference point 4910 (e.g., a zero axis of rotation or any other point or position of interest). Signals, e.g., a rotor position signal 4150, from the one or more sensors 4100 may be provided to the one or more image capture devices 4200 (e.g., a camera). The signals, e.g., the rotor position signal 4150, may be configured to trigger an image capture and/or an adjustment of a frame rate of the one or more image capture devices 4200, so that the frame rate matches a given position of the machine 4900, e.g., a predetermined position of the rotating shaft. As such, whether the signals trigger the image capture or adjust the frame rate, the position of the machine, e.g., the rotating shaft, is known when the image is captured.

The one or more image capture devices 4200 may be configured to image any portion 4990 of the structure to be captured that is of interest. The system 4000 is configured to generate machine-position-synchronized images, i.e., e.g., the images may not be keyed to a calculated or determined speed of the shaft and/or the fps of a camera, but rather the system 4000 may provide machine-position-synchronized images. Such machine-position-synchronized images may be captured in accordance with the position of the machine 4900 (e.g., the rotating shaft) and may be processed by the processor 4300 into an image or video of the machine 4900, which may form the output 4400 for further analysis or processing, display, and the like.

The synchronized images improve accuracy of a process of analyzing the machine-position-synchronized images and/or videos derived from the same to detect or analyze a motion, a vibration and/or an aberrant condition of the machine 4900. Also, analysis of the machine-position-synchronized images or videos derived from the same provides improved detection of types of motion, vibration or aberrant conditions that are not readily apparent to systems including those keyed to non-phase-synchronized parameters such as speed and/or camera fps rate.

Exemplary Application to Turbomachinery Drivetrain

In the turbomachinery art, as noted above, developed methods to detect malfunctions were limited. With the developed 1× systems, the present inventor determined that non-linear motion in a rotor system results in harmonics at a given running speed in an unfiltered signal related to shaft rotation. Vibration components not related to the 1× system were not capable of performing appropriate filtering to properly analyze phenomena of interest.

The harmonics from the rotor system including non-linear motion may be monitored with narrow passband filters with a center frequency at, for example, twice the running speed (2×), three times the running speed (3×), and the like. An aberrant condition such as imminent or actual malfunction from, e.g., imbalance, may be discerned using 2× and 3× narrow passband signals.

The 2× and 3× filtered signals may be plotted. In some exemplary embodiments, the plot of the 2× and 3× filtered signals may be compared with and/or separated from a plot of the 1× response. One or more of these plots may be analyzed or viewed to permit determination of a balance response of the machine.

The synchronous motion capture process of the present disclosure provides a visual representation of motion of a viewed target. The synchronous motion capture process may be used to visualize and/or analyze the motion of the viewed target in one or more of the 1×, 2× and 3× bands. For example, by sampling 8 synchronous frames per revolution (i.e., e.g., every 45° of a 360° circular shaft) allows an analysis system to output information representing the motion of, for example, the 1×, 2×, 3× and the like components.

However, some malfunctions (e.g., whirl (i.e., e.g., for a shaft with bearings, rotation of a plane of a bent shaft and a line of a center of a plurality of bearings) or whip (i.e., excessive vibration of, e.g., a shaft)) do not exhibit a change in vibration at the 1×, 2×, 3×, and the like bands. That is, the fundamental and harmonic frequencies of such whirl and whip motions may not reveal imminent or actual whirl or whip malfunctions.

As such, one or more of the 1×, 2×, 3×, etc. bands may be analyzed and/or displayed alongside synchronous motion. For example, for a camera with a high frame rate, comparison may be made with fundamental vibration frequency, e.g., about 1,000 frames per second on a rotor operating at about 1,800 revolutions per minute (rpm) (about 30 Hz). In some exemplary embodiments, a number of synchronous frames may be set per revolution. For example, if the number of synchronous frames per revolution is set at 8 frames per revolution, then every 4⅙ frame may be tagged as synchronous. The actual frame number may be rounded, i.e., e.g., frame 4, 8, 12, 17, 21, and the like. The rounded frame number may be tagged as synchronous frames or interpolated between the two nearest frames to synthesize a synchronous frame. In either case (rounding or interpolation), frames may be tagged as either synchronous or asynchronous. The tagging as either synchronous or asynchronous may be used to generate a visualization or analysis platform for either set of frames. The tagging and differentiated visualizations are not present in developed systems.

Figure 5:
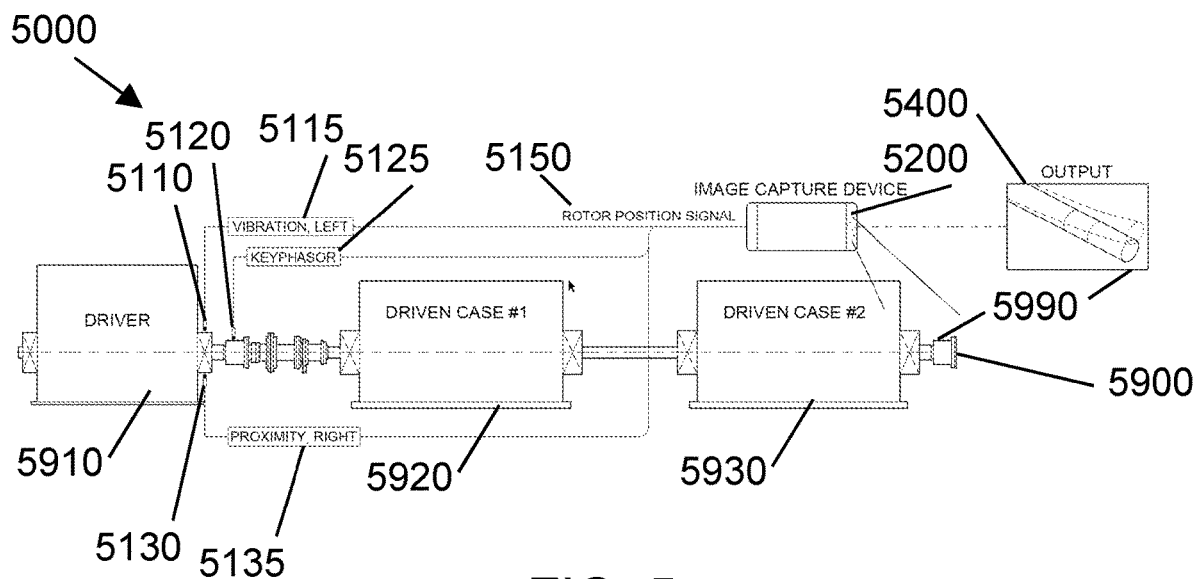
FIG. 5 is a schematic diagram illustrating a system for a turbomachinery drivetrain according to an exemplary embodiment.

FIG. 5 shows a schematic of an improved system 5000 for motion, vibration and aberrant condition detection and analysis of, e.g., a turbomachinery drivetrain. The turbomachinery drivetrain may be utilized, e.g., in power generation and oil and gas applications. In this non-limiting example, at least one of one or more sensors may be configured to collect information regarding a machine including a driver 5910 configured to drive one or more rotating shafts, e.g., shaft 5900. Output of the one or more sensors may be combined to generate a rotor position signal 5150. In some exemplary embodiments, the one or more sensors may include a vibration sensor 5110, a sensor for a KEYPHASOR™ 5120, and a proximity sensor 5130, either alone or in combination (as shown). At least one of the vibration sensor 5110, the sensor for the KEYPHASOR™ 5120, and the proximity sensor 5130 may be configured to generate a vibration signal 5115, a signal for a KEYPHASOR™ 5125, and a proximity signal 5135, respectively, which may be combined, for example, with a processor, to generate the rotor position signal 5150. In some exemplary embodiments, the turbomachinery drivetrain may include a driven case #1 5920 and a driven case #2 5930; however, the system 5000 is not limited to such configuration. Although the sensors 5110, 5120, 5130 are shown between the driver 5910 and the driven case #1 5920, the system 5000 is not limited to such configuration.

The rotor position signal 5150 may be configured to trigger an image capture and/or an adjustment of a frame rate of one or more image capture devices 5200, so that the frame rate matches a given position of the machine, including the shaft 5900, e.g., a predetermined position of the rotating shaft. In some exemplary embodiments, multiple signals may generate multiple rotor position signals, and at least one multiple signal or at least one multiple rotor position signal may be configured to trigger the one or more image capture devices 5200 configured to capture information about different portions of the machine. In some exemplary embodiments, the image capture device 5200 may be configured to collect information from an outboard end (e.g., the right side of FIG. 5) of the driven case #2 5930, which may be used to capture information including a portion 5990 of the shaft 5900 to be captured that is of interest, including, e.g., a rotor image and a fixed angle of rotation (although the system

5000 is not limited to collecting only this information). Indeed, the system 5000 may be configured to collect information about any portion of the turbomachinery drivetrain, particularly portions that have motion, vibration, normal operating conditions, aberrant operating conditions, and the like. The motion, vibration, normal operating conditions, aberrant operating conditions, and the like may be observed on rotating parts, reciprocating parts, sliding parts in frictional engagement with each other, and the like.

Figure 7:
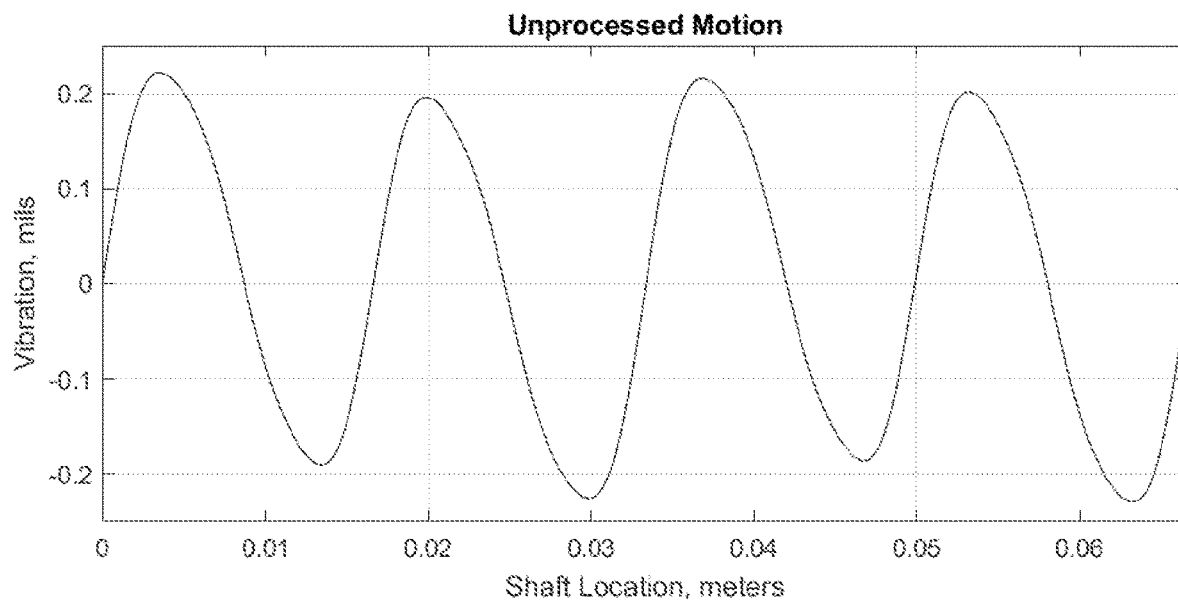
FIG. 7 is a plot of unprocessed motion including shaft location (x-axis, meters) versus vibration (y-axis, mils) according to an exemplary embodiment.

Motion amplification is applied to the video to visualize the vibration. To show how this works, FIG. 7 shows an example of shaft motion seen without a phase reference (unprocessed image).

The one or more image capture devices 5200 may be configured to image any portion 5990 of the structure to be captured that is of interest. The system 5000 is configured to generate machine-position-synchronized images, i.e., e.g., the images may not be keyed to a calculated or determined speed of the shaft and/or the fps of a camera, but rather the system 5000 may provide machine-position-synchronized images. Such machine-position-synchronized images may be captured in accordance with the position of the shaft 5900 (e.g., the rotor image and the fixed angle of rotation) and may be processed by the processor (not shown, similar to the processor 4300 or any other suitable processor) into an image or video of the shaft 5900, which may form the output 5400 for further analysis or processing, display, and the like.

The synchronized images improve accuracy of a process of analyzing the machine-position-synchronized images and/or videos derived from the same to detect or analyze a motion, a vibration and/or an aberrant condition of the shaft 5900. Also, analysis of the machine-position-synchronized images or videos derived from the same provides improved detection of types of motion, vibration or aberrant conditions that are not readily apparent to systems including those keyed to non-phase-synchronized parameters such as speed and/or camera fps rate.

Operational Method

Figure 6:
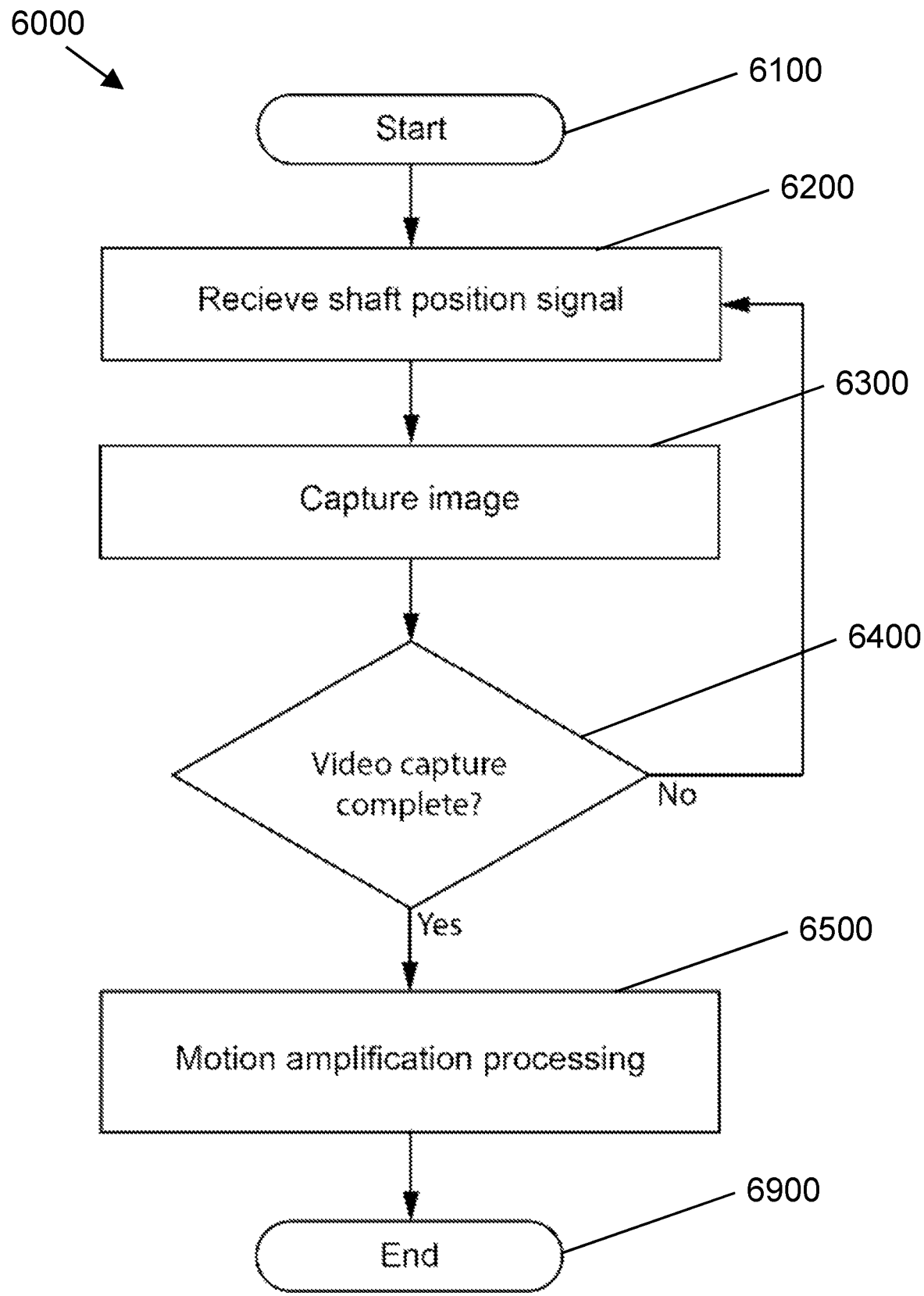
FIG. 6 is a process diagram illustrating an operational process according to an exemplary embodiment.

FIG. 6 shows an exemplary operational flow diagram of an exemplary process 6000. The process 6000 may start 6100 by receiving a position signal (including, e.g., a shaft position signal or one of the rotor position signals noted herein) 6200. The position signal may be generated by a sensor, including a shaft position sensor, which may be configured to trigger an image capture 6300. The process 6000 may include a query 6400 of whether a video capture process is complete. If the video capture is not complete (i.e., "No"), then the process 6000 may return to the receiving of the position signal 6200. The image capture device may be reset and configured to wait for a next position signal.

Motion amplification processing 6500 may be applied to the images and/or a video derived from the images to visualize a property of an observed system including, e.g., vibration of a portion of the observed system. After the motion amplification processing 6500, the process 6000 may end 6900.

Figure 8:
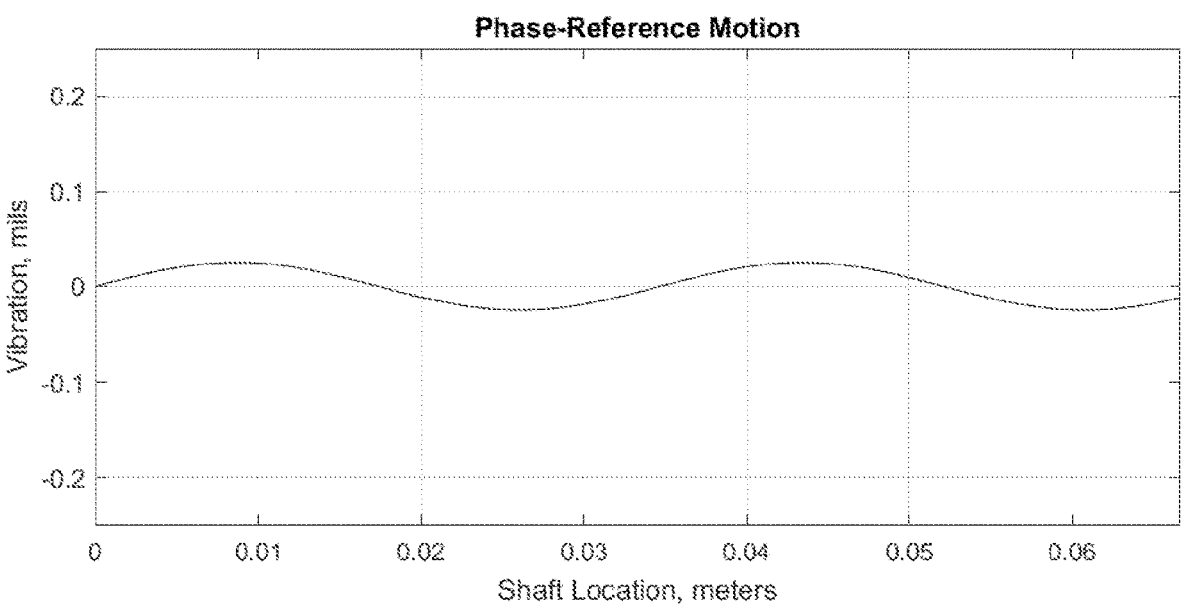
FIG. 8 is a plot of phase-referenced motion including shaft location (x-axis, meters) versus vibration (y-axis, mils) according to an exemplary embodiment.

FIG. 7 is a plot of unprocessed motion including shaft location (x-axis, meters) versus vibration (y-axis, mils) according to an exemplary embodiment. FIG. 7 is an example of a motion of a rotating shaft plotted without a phase reference, e.g., an unprocessed image or video. Whereas, FIG. 8 is a plot of phase-referenced motion, which may include shaft location (x-axis, meters) versus vibration (y-axis, mils) according to an exemplary embodiment. The phase reference may include but is not limited to a rotation of a shaft, a periodic reciprocating motion of a reciprocating member of a machine, a baseline condition of fluid flowing through a pipeline or conduit, and the like. As is readily apparent from FIGS. 7 and 8, the phase-referenced motion smooths out variations in the data that may not be the result of an aberrant or undesired operating condition but which may result from, for example, slight eccentricities in the machine, slight variations in manufacturing tolerances, and the like. That is, the phase-referenced motion helps reduce noise in the data that might otherwise mask useful information relating to a current, ongoing and/or future deviation from normal operation (which may be a predetermined tolerance for a given machine) including a current, ongoing and/or future aberrant condition.

The machine-position-synchronized images and/or videos (described herein) may be generated using the phase-referenced motion. Image capture including such phase reference improves accuracy of a process of analyzing machine-position-synchronized images and/or videos derived from the same to detect or analyze a motion, a vibration and/or an aberrant condition of the machine being analyzed with the process 6000. Also, analysis of the machine-position-synchronized images or videos derived from the same provides improves detection of types of motion, vibration or aberrant conditions that are not readily apparent to systems including those keyed to non-phase-synchronized parameters such as speed and/or camera fps rate.

Application to Detect Relative Vibration

Developed eddy-current probes were used to make relative vibration measurements between a shaft and a bearing. The developed eddy-current probes are typically installed inside a machine, on or near a bearing, to measure, e.g., shaft motion relative to the bearing. Cables for the eddy-current probes are routed out of a housing of the bearing through a seal to a junction box. As such, installation and/or maintenance of the developed eddy-current probes required that the machine be shut down and/or modified, both of which are expensive to the customer, causing undesirable downtime, delay and the like.

Figure 9:
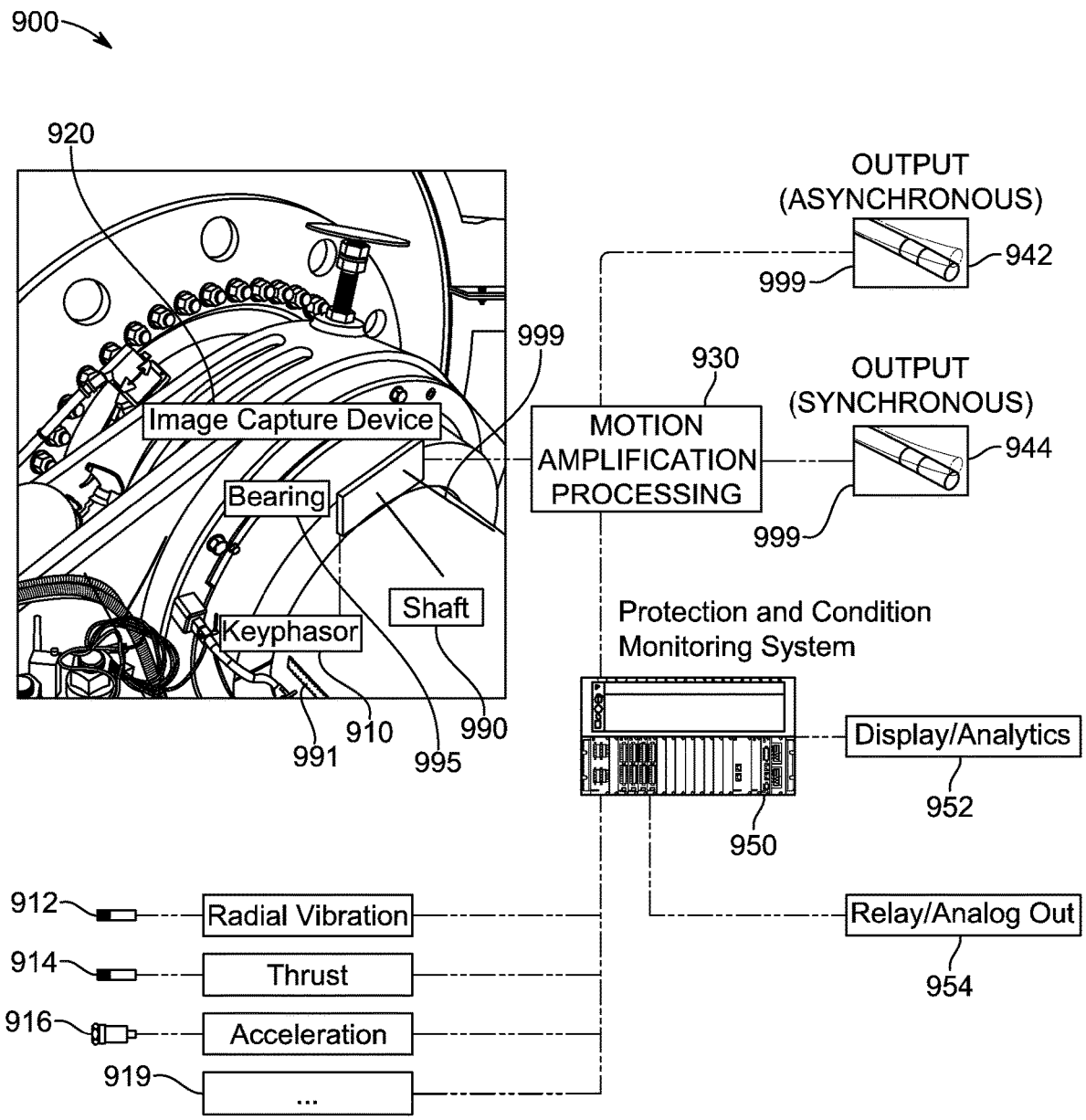
FIG. 9 is a schematic diagram of a system for detecting synchronous relative motion and vibration according to an exemplary embodiment.

In lieu of (or possibly in addition to) the developed eddy-current probes, synchronous motion amplification according to the present disclosure may be provided. In some exemplary embodiments, a system 900 having a shaft 990 and a bearing 995 may further include an image capture device 920. The image capture device 920 may be mounted, for example, on the bearing 995 in a position to image a portion, e.g., 999, of the shaft 990, for example, in the manner as shown in FIG. 9. The image capture device 920 may be configured to acquire images of the shaft 990 in any of the manners disclosed herein. The system 900 may include a probe for a KEYPHASOR™ 910. The probe for the KEYPHASOR™ 910 may be configured to provide a synchronous pulse that allows the image capture device 920 to tag images generated by the image capture device 920 in a manner that is synchronous with a rotation of the shaft 990. The rotation of the shaft 990 may be determined by the system 900 using, for example, a fixed reference point, e.g., 991, on the shaft 990, which may include a zero axis of rotation or any other point or position of interest.

The system 900 may include one or more of the following: one or more sensors, one or more image capture devices 920, and one or more processors 930 configured to conduct processing, e.g., motion analysis processing including motion amplification processing, and/or configured to transmit output related to the output of the one or more image capture devices 920. The output may be provided, for example, as an asynchronous image or video 942 and/or a synchronous image or video 944. The images/video 942, 944 may include display of the portion 999 of the shaft 990 or any other portion of the system 900 of interest.

The one or more sensors may be of any suitable type including a magnetostrictive sensor, an encoder, a torque sensor, a KEYPHASOR™, a radial vibration sensor, a thrust sensor, an acceleration sensor, a shear sensor, a stress sensor, a strain sensor, an angular momentum sensor, a tension sensor, a compression sensor, a vibration sensor, any sensor configured to obtain information about one or more portions of a rotating shaft, a reciprocating machine, turbomachinery, pipes, pipelines, and the like, either alone or in any suitable combination with one or more of the other listed sensors other, or any other type of sensor. In some exemplary embodiments, a sensor 910 may be a KEYPHASOR™, a sensor 912 may be a radial vibration sensor, a sensor 914 may be a thrust sensor, a sensor 916 may be an acceleration sensor, and a sensor 919 may be any one or more of those noted herein.

The system 900 is configured for visualization of asynchronous and synchronous motion. The motion amplification processing of the processor 930 may be configured to output a signal related to the motion amplification for consumption by a protection and/or condition monitoring system 950. The protection and/or condition monitoring system 950 may be configured to determine an estimated distance of movement of the shaft 990 in a given (e.g., vertical) direction. The output from the processor 930 and/or the system 950 may be combined with other measurements and the combination of measurements may be used to drive display features (e.g., plots, states, etc.). The output from the processor 930 and/or the system 950 may be inputted into a display and/or analytics module 952 for additional analysis. The output from the processor 930 and/or the system 950 may be inputted into drive relays and/or analog outputs 954.

The one or more image capture devices 920 may be configured to image any portion 999 of the system 900 to be captured that is of interest. The system 900 may be configured to generate machine-position-synchronized images, i.e., e.g., the images may not be keyed to a calculated or determined speed of the shaft and/or the fps of a camera, but rather the system 900 may provide machine-position-synchronized images. Such machine-position-synchronized images may be captured in accordance with the position of the machine 990 (e.g., the vertical displacement of the shaft 990) and may be processed by the processor (e.g., 930) into an image or video of the machine 990, which may form the output 942, 944 for further analysis or processing, display, and the like.

The synchronized images improve accuracy of a process of analyzing the machine-position-synchronized images and/or videos derived from the same to detect or analyze a motion, a vibration and/or an aberrant condition of the machine 990. Also, analysis of the machine-position-synchronized images or videos derived from the same provides improved detection of types of motion, vibration or aberrant conditions that are not readily apparent to systems including those keyed to non-phase-synchronized parameters such as speed and/or camera fps rate.

Application to Detect Vibration in Pipes or Pipelines

Compression and gas processing systems often experience pipe or pipeline vibration. Analysis procedures for compression and gas processing systems may include attachment of one or more sensors to the pipe or pipeline, acquiring vibration data, and analyzing the vibration data in a visualization package. The analysis procedures may include spectral analysis to identify, e.g., primary frequency components and how the primary frequency components relate to an operating state of equipment (including, e.g., pumps, compressors, and the like) attached to the pipe or pipeline system. Identifying a source of the vibration may be important to determining a root cause of the vibration. In some embodiments, instrumentation must be added or relocated to improve detection and response, which consumes time and resources.

Motion capture synchronized to one or more machines connected to a pipe results in a desirable separation of information regarding vibration and/or pipe movement with respect to respective ones of the one or machines. One or more image capture devices may be added and/or relocated along the pipe as required or desired for troubleshooting. As shown, for example, in FIG. 10, a pipeline system 1000 may include one or more pieces of pipe or pipeline equipment including, e.g., a booster compressor #1 1090 and a booster compressor #2 1094. At least one of the booster compressor #1 1090 and the booster compressor #2 1094 may have a motor M. One or more sensors 1010, 1014 may be installed to one or more portions of the booster compressor #1 1090 and the booster compressor #2 1094. The one or more sensors 1010, 1014 may be configured to transmit information about the system 1000. In some exemplary embodiments, at least one of the one or more sensors 1010, 1014 may be a sensor for a KEYPHASOR™ for generating signals for the KEYPHASOR™ 1012, 1016, respectively. As described herein, the signals for the KEYPHASOR™ 1012, 1016 may trigger image capture by one or more image capture devices 1020.

Figure 10:
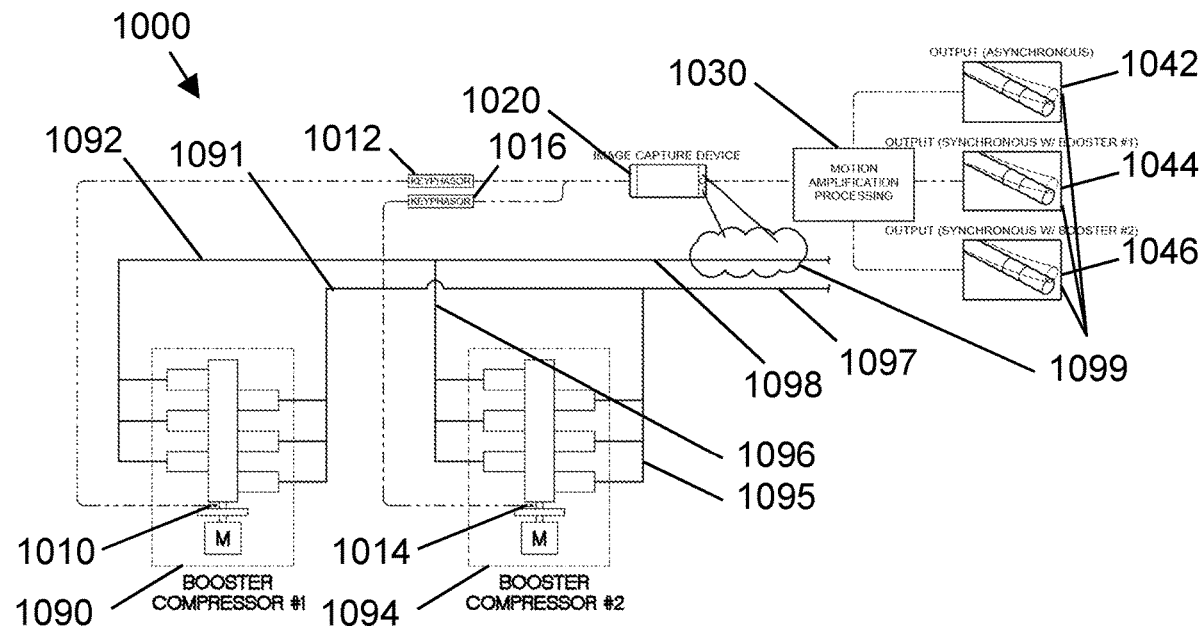
FIG. 10 is a schematic diagram of a system for detecting vibration of pipes or pipelines according to an exemplary embodiment.

The pipeline system 1000 may further include an inlet pipe 1091 configured to input fluid into the booster compressor #1 1090, and an outlet pipe 1092 configured to output fluid from the booster compressor #1 1090. The pipeline system 1000 may further include an inlet pipe 1095 configured to input fluid into the booster compressor #2 1094, and an outlet pipe 1096 configured to output fluid from the booster compressor #2 1094. In some exemplary embodiments, the inlet pipe 1091 and the inlet pipe 1095 may branch from a common inlet pipe 1097. Similarly, in some exemplary embodiments, the outlet pipe 1092 and the outlet pipe 1096 may converge into a common outlet pipe 1098. In some exemplary embodiments, the one or more image capture devices 1020 may be mounted, for example, in a position to image a portion, e.g., 1099, of a pipe of the system 1000, which may include, for example, a portion of the outlet pipe 1098, for example, in the manner as shown in FIG. 10 (although the system 1000 is not limited to this configuration).

The system 1000 may include one or more processors 1030 configured to conduct processing, e.g., motion analysis processing including motion amplification processing, and/or configured to transmit output related to the output of the one or more image capture devices 1020. The output may be provided, for example, as one or more asynchronous images or videos 1042 and/or one or more synchronous images or video, which may include an image or video synchronous with the booster compressor #1 1090, and/or an image or video synchronous with the booster compressor #2 1094. The images/video 1042, 1044 may include display of the portion 1099 of the outlet pipe 1098 or any other portion of the system 900 of interest.

In some exemplary embodiments, one or more of the signals for the KEYPHASOR™ 1012, 1016 may include a rotor position reference for one or more of the booster compressor #1 1090, and/or the booster compressor #2 1094. The signals for the KEYPHASOR™ 1012, 1016 may be inputted in the one or more image capture devices 1020 and/or the one or more processors 1030. In some exemplary embodiments, the signals 1012, 1016 may trigger motion capture. As such, the system 1000 may be configured to output motion images and video that are synchronous with the booster compressor #1 1090, and/or the booster compressor #2 1094, and/or asynchronous output. As with the system 900, the motion amplification processor 1030 could output a signal related to a feature in the image for input into and analysis by a protection and/or condition monitoring system, e.g., a system similar to the protection and/or condition monitoring system 950 of the system 900.

The one or more image capture devices 1020 may be configured to image any portion 1099 of the system 1000 to be captured that is of interest. The system 1000 may be configured to generate machine-position-synchronized images, i.e., e.g., the images may not be keyed to a calculated or determined speed of the shaft and/or the fps of a camera, but rather the system 1000 may provide machine-position-synchronized images. Such machine-position-synchronized images may be captured in accordance with a condition of the machine 1090 (e.g., the vertical displacement of the output pipe 1098) and may be processed by the processor (e.g., 1030) into an image or video of the machine 1090, which may form the output 1042, 1044, 1046 for further analysis or processing, display, and the like.

The synchronized images improve accuracy of a process of analyzing the machine-position-synchronized images and/or videos derived from the same to detect or analyze a motion, a vibration and/or an aberrant condition of the machine 1090. Also, analysis of the machine-position-synchronized images or videos derived from the same provides improved detection of types of motion, vibration or aberrant conditions that are not readily apparent to systems including those keyed to non-phase-synchronized parameters such as speed and/or camera fps rate. In the pipe or pipeline application, the analysis of the machine-position-synchronized images or videos derived from the same provides improved identification of a source of vibration in addition to vibration detection itself Application to Detect Torsional Vibration A variety of sensors (e.g., magnetostrictive, encoders, strain, and the like) may be used to measure torsional vibration on a shaft. In some exemplary embodiments, in order to install the sensors, the sensors require modification, for example, machining. The modification and related outage are costly to customers. In addition, some of the techniques (e.g., using encoders, demodulation, and the like) require additional signal processing and analytics to arrive at certain parameters of interest, e.g., stress induced in a rotor by the torsional vibration.

Figure 11:
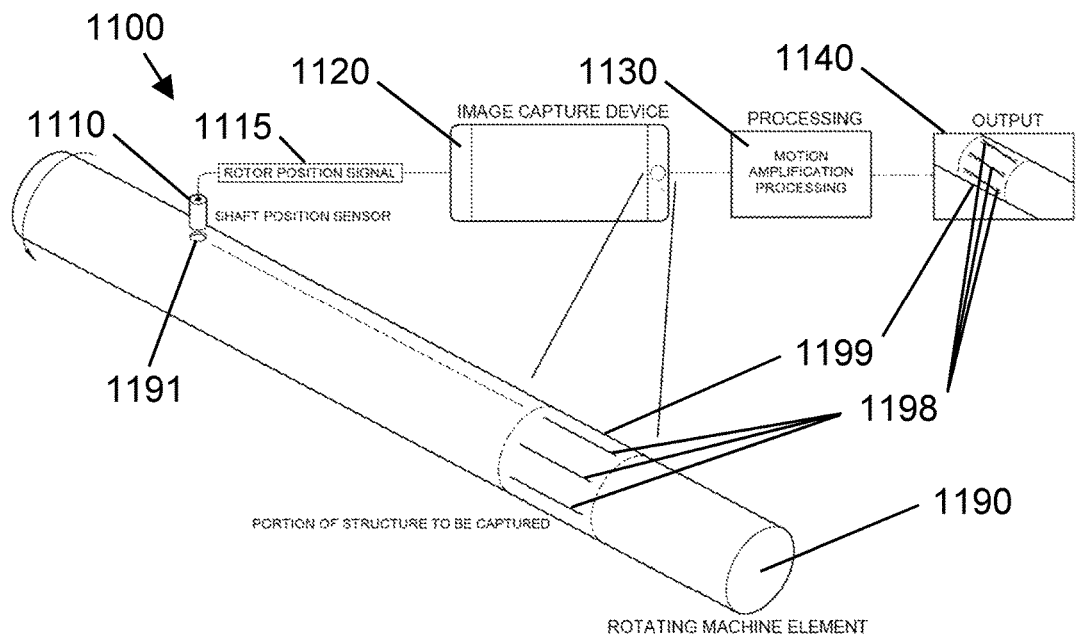
FIG. 11 is a schematic diagram of a system for detecting torsional vibration of a shaft according to an exemplary embodiment.

Synchronous motion amplification may be used to measure torsional vibration and stress on a shaft. As shown, for example, in FIG. 11, an improved system 1100 for motion, vibration and aberrant condition detection and analysis for a machine 1190 is provided. The machine 1190 may be a rotating shaft, a reciprocating portion of a reciprocating machine, turbomachinery, a related machine, and the like. The system 1100 may include one or more of the following: one or more sensors 1110, one or more image capture devices 1120, and one or more processors 1130 configured to conduct processing, e.g., motion analysis processing including motion amplification processing, and/or configured to transmit output 1140 related to the output of the one or more image capture devices 1120. The one or more sensors 1110 may be configured to measure a portion of the machine 1190, e.g., a shaft (as shown in FIG. 11). The one or more sensors 1110 may be configured to measure (or estimate) a position of the shaft relative to, e.g., a fixed reference point 1191 (e.g., a zero axis of rotation or any other point or position of interest). Signals, e.g., a rotor position signal 1115, from the one or more sensors 1110 may be provided to the one or more image capture devices 1120 (e.g., a camera). The signals, e.g., the rotor position signal 1115, may be configured to trigger an image capture and/or an adjustment of a frame rate of the one or more image capture devices 1120, so that the frame rate matches a given position of the machine 1190, e.g., a predetermined position of the rotating shaft. As such, whether the signals trigger the image capture or adjust the frame rate, the position of the machine, e.g., the rotating shaft, is known when the image is captured.

The one or more image capture devices 1120 may be configured to image any portion 1199 of the structure to be captured that is of interest. The system 1100 is configured to generate machine-position-synchronized images, i.e., e.g., the images may not be keyed to a calculated or determined speed of the shaft and/or the fps of a camera, but rather the system 1100 may provide machine-position-synchronized images. Such machine-position-synchronized images may be captured in accordance with the position of the machine 1190 (e.g., the rotating shaft) and may be processed by the processor 1130 into an image or video of the machine 1190, which may form the output 1140 for further analysis or processing, display, and the like.

The synchronized images improve accuracy of a process of analyzing the machine-position-synchronized images and/or videos derived from the same to detect or analyze a motion, a vibration and/or an aberrant condition of the machine 1190. Also, analysis of the machine-position-synchronized images or videos derived from the same provides improved detection of types of motion, vibration or aberrant conditions that are not readily apparent to systems including those keyed to non-phase-synchronized parameters such as speed and/or camera fps rate.

The system 1100 may include one or more longitudinal marks 1198 evenly spaced angularly about a circumference of the machine 1190. For example, one of the marks 1198 may be aligned with a KEYPHASOR™ on a shaft of the machine 1190. The one or more of the image capture devices 1120 and/or the one or more of the motion amplification processor 1130 may be configured to trigger when at least one of the marks 1198 passes under the one or more of the image capture devices 1120 and/or the one or more of the motion amplification processor 1130. In some exemplary embodiments, a number x, e.g., eight (8), equally spaced marks 1198 may be provided about the circumference of a rotating shaft. The system 1100 may be configured to capture a frame or image for every 360°/x (e.g., 360°/8=every 45°) of rotation of the shaft. As such, the system 1100 may be configured to generate the output 1140 as motion amplified output. The motion amplified output may be used to determine a torsional twist of the longitudinal marks. For a steel shaft, an angle of the twist is proportional to a stress and torsional amplitude on the steel shaft.

In other exemplary embodiments, the system 1100 may be synchronously triggered by indicia including a bolt, nut, or other feature passing under the one or more image capture devices 1120. In some exemplary embodiments, in order to avoid aliasing, the system 1100 may be operated such that the torsional vibration is less than half of a running speed. If the system 1100 is operated such that the torsional vibration is less than half of the running speed, then the torsional vibration frequency may be measured directly from an angular displacement of the rotating shaft. If the system 1100 is operated such that the torsional vibration is less than half of the running speed, then a torsional stress may be estimated from a model or by installing a second synchronous motion amplification systems (similar to one or portions of the system 1100) at a second point along the rotating shaft. A difference in the angular displacement determined by two such systems may be used to determine an angle of twist of the shaft section between planes associated with the two measurement positions of the two such systems.

TERMINOLOGY

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

The use of the terms "first", "second", "third" and so on, herein, are provided to identify various structures, dimensions or operations, without describing any order, and the structures, dimensions or operations may be executed in a different order from the stated order unless a specific order is definitely specified in the context.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are substantially remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be embodied in systems, apparatus, methods, and/or articles depending on the desired configuration. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other embodiments may be within the scope of the following claims.

What is claimed is:

1. A method, comprising:
   determining a position of at least one portion of a machine in motion or a fluid transfer system in operation by a position sensor;
   collecting images of the at least one portion of the machine or the fluid transfer system with an image collector, wherein an image capture rate of the image collector is selected based upon the determined position;
   synchronizing the determined position of the at least one portion of the machine or the fluid transfer system with at least a selected one of the images of the at least one portion of the machine or the fluid transfer system;
   amplifying at least one of the collected images and/or the selected one of the images of the at least one portion of the machine or the fluid transfer system; and
   providing the amplified at least one of the collected images and/or the selected one of the images of the at least one portion of the machine or the fluid transfer system.

2. The method of claim 1, wherein an image capture rate of the image collector is a number of the images of the at least one portion of the machine per revolution or reciprocation of the machine or a number of the images corresponding with a repeating cycle of a pumping system of the fluid transfer system, and wherein the image capture rate of the image collector is not a number of frames per unit of time.

3. The method of claim 1, wherein the amplifying includes amplifying display of motion across a distance greater than about 0.1 μm and less than about 100 μm.

4. The method of claim 1, wherein, in the collecting images of the at least one portion of the machine or the fluid transfer system with an image collector, for at least one image, a signal to store the image is sent in response to a specified position of the machine, the fluid transfer system, or a pumping system of the fluid transfer system.

5. The method of claim 1, further comprising:
   outputting a video including the amplified at least one of the collected images and/or the selected one of the images of the at least one portion of the machine or the fluid transfer system, wherein the video includes an indicator of the position for one or more frames; and/or
   detecting a structural condition based on the amplified at least one of the collected images and/or the selected one of the images of the at least one portion of the machine or the fluid transfer system, wherein the structural condition is a vibration condition, and wherein the vibration condition is a lateral mode shape, torsional vibration, or torsional deflection.

6. The method of claim 1, further comprising:
   transmitting instructions to a motive power supply of the machine or a pumping system for moving fluid through the fluid transfer system to actuate the machine or the pumping system;
   detecting a structural condition or a vibration condition of the machine or the fluid transfer system based on the amplified at least one of the collected images and/or the selected one of the images of the machine or the fluid transfer system;
   determining whether a predetermined threshold deviates from a predetermined standard indicative of a normal operation of the machine or the fluid transfer system; and
   signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

7. The method of claim 6, further comprising changing the instructions to the motive power supply of the machine or the pumping system based on the determining whether the predetermined threshold deviates from the predetermined standard indicative of the normal operation of the machine to mitigate the aberrant operating condition.

8. A system, comprising:
   at least one processor; and
   a memory storing at least one program for execution by the at least one processor, the at least one program including instructions, which when executed by the at least one processor cause the at least one processor to perform operations comprising:
   determining a position of at least one portion of a machine in motion or a fluid transfer system in operation based upon a signal provided by a position sensor;

collecting images of the at least one portion of the machine or the fluid transfer system with an image collector, wherein an image capture rate of the image collector is selected based the signal provided by the position sensor;

synchronizing the determined position of the at least one portion of the machine or the fluid transfer system with at least a selected one of the images of the at least one portion of the machine or the fluid transfer system;

amplifying at least one of the collected images and/or the selected one of the images of the at least one portion of the machine for the fluid transfer system; and providing the amplified at least one of the collected images and/or the selected one of the images of the at least one portion of the machine or the fluid transfer system.

9. The system of claim 8, the system further comprising:
the machine;
a motive power supply configured to actuate the machine; and
the image collector configured to collect images of the machine.

10. The system of claim 8, wherein an image capture rate of the image collector is a number of the images of the at least one portion of the machine per revolution or reciprocation of the machine or a number of the images corresponding with a repeating cycle of a pumping system of the fluid transfer system, and wherein the image capture rate of the image collector is not a number of frames per unit of time.

11. The system of claim 8, wherein the amplifying includes amplifying display of motion across a distance greater than about 0.1 μm and less than about 100 μm.

12. The system of claim 8, wherein, in the collecting images of the at least one portion of the machine or the fluid transfer system with an image collector, for at least one image, a signal to store the image is sent in response to a specified position of the machine, the fluid transfer system, or a pumping system of the fluid transfer system.

13. The system of claim 8, the operations further comprising:
outputting a video including the amplified at least one of the collected images and/or the selected one of the images of the at least one portion of the machine or the fluid transfer system, wherein the video includes an indicator of the position for one or more frames; and/or
detecting a structural condition based on the amplified at least one of the collected images and/or the selected one of the images of the at least one portion of the machine or the fluid transfer system, wherein the structural condition is a vibration condition, and wherein the vibration condition is a lateral mode shape, torsional vibration, or torsional deflection.

14. The system of claim 8, the operations further comprising:
transmitting instructions to a motive power supply of the machine or a pumping system for moving fluid through the fluid transfer system to actuate the machine or the pumping system;
detecting a structural condition or a vibration condition of the machine or the fluid transfer system based on the amplified at least one of the collected images and/or the selected one of the images of the machine or the fluid transfer system;

determining whether a predetermined threshold deviates from a predetermined standard indicative of a normal operation of the machine or the fluid transfer system; and signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

15. A non-transitory computer-readable storage medium storing at least one program, the at least one program for execution by at least one processor and a memory storing the at least one program, the at least one program including instructions, which when executed by the at least one processor cause the at least one processor to perform operations comprising:

determining a position of at least one portion of a machine in motion or a fluid transfer system in operation based upon a signal provided by a position sensor;

collecting images of the at least one portion of the machine or the fluid transfer system with an image collector, wherein an image capture rate of the image collector is selected based upon the signal provided by the position sensor;

synchronizing the determined position of the at least one portion of the machine or the fluid transfer system with at least a selected one of the images of the at least one portion of the machine or the fluid transfer system;

amplifying the at least one of the collected images and/or the selected one of the images of the at least one portion of the machine for the fluid transfer system; and providing the amplified at least one of the collected images and/or the selected one of the images of the at least one portion of the machine or the fluid transfer system.

16. The non-transitory computer-readable storage medium of claim 15, wherein an image capture rate of the image collector is a number of the images of the at least one portion of the machine per revolution or reciprocation of the machine or a number of the images corresponding with a repeating cycle of a pumping system of the fluid transfer system, and wherein the image capture rate of the image collector is not a number of frames per unit of time.

17. The non-transitory computer-readable storage medium of claim 15, wherein the amplifying includes amplifying display of motion across a distance greater than about 0.1 μm and less than about 100 μm.

18. The non-transitory computer-readable storage medium of claim 15, wherein, in the collecting images of the at least one portion of the machine or the fluid transfer system with an image collector, for at least one image, a signal to store the image is sent in response to a specified position of the machine, the fluid transfer system, or a pumping system of the fluid transfer system.

19. The non-transitory computer-readable storage medium of claim 15, the operations further comprising:
outputting a video including the amplified at least one of the collected images and/or the selected one of the images of the at least one portion of the machine or the fluid transfer system, wherein the video includes an indicator of the position for one or more frames; and/or
detecting a structural condition based on the amplified at least one of the collected images and/or the selected one of the images of the at least one portion of the machine or the fluid transfer system, wherein the structural condition is a vibration condition, and wherein the vibration condition is a lateral mode shape, torsional vibration, or torsional deflection.

20. The non-transitory computer-readable storage medium of claim 15, the operations further comprising:
   transmitting instructions to a motive power supply of the machine or a pumping system for moving fluid through the fluid transfer system to actuate the machine or the pumping system;
   detecting a structural condition or a vibration condition of the machine or the fluid transfer system based on the amplified at least one of the collected images and/or the selected one of the images of the machine or the fluid transfer system;
   determining whether a predetermined threshold deviates from a predetermined standard indicative of a normal operation of the machine or the fluid transfer system; and
   signaling an operation status of the machine or the fluid transfer system, and/or changing the instructions to the motive power supply of the machine or the pumping system based on the determining whether the predetermined threshold deviates from the predetermined standard indicative of the normal operation of the machine so as to indicate an aberrant operating condition of the machine or the fluid transfer system; and/or to mitigate the aberrant operating condition.

* * * * *